United States Patent
Oeda

(10) Patent No.: US 7,970,903 B2
(45) Date of Patent: Jun. 28, 2011

(54) STORAGE AND SERVER PROVISIONING FOR VIRTUALIZED AND GEOGRAPHICALLY DISPERSED DATA CENTERS

(75) Inventor: Takashi Oeda, Los Altos, CA (US)

(73) Assignee: Hitachi, Ltd., Tokyo (JP)

(*) Notice: Subject to any disclaimer, the term of this patent is extended or adjusted under 35 U.S.C. 154(b) by 306 days.

(21) Appl. No.: 11/892,045

(22) Filed: Aug. 20, 2007

(65) Prior Publication Data

US 2009/0055507 A1    Feb. 26, 2009

(51) Int. Cl.
*G06F 15/173* (2006.01)
*G06F 9/46* (2006.01)

(52) U.S. Cl. .................. 709/226; 718/104; 718/105

(58) Field of Classification Search .......... 709/213–226; 711/200, 202, 209; 707/200–205; 718/100–108
See application file for complete search history.

(56) References Cited

U.S. PATENT DOCUMENTS

| | | | |
|---|---|---|---|
| 6,442,663 B1 | 8/2002 | Sun et al. | |
| 6,779,078 B2* | 8/2004 | Murotani et al. | 711/112 |
| 6,854,034 B1 | 2/2005 | Kitamura et al. | |
| 6,934,805 B2* | 8/2005 | Hickman et al. | 711/114 |
| 7,146,368 B2* | 12/2006 | Sonoda et al. | 1/1 |
| 7,761,573 B2* | 7/2010 | Travostino et al. | 709/226 |
| 2004/0055004 A1 | 3/2004 | Sun et al. | |
| 2004/0103254 A1* | 5/2004 | Satoyama et al. | 711/150 |
| 2006/0005189 A1* | 1/2006 | Vega et al. | 718/1 |
| 2006/0224775 A1* | 10/2006 | Lee et al. | 709/248 |
| 2008/0082777 A1* | 4/2008 | Sakaguchi et al. | 711/170 |
| 2008/0086616 A1* | 4/2008 | Asano et al. | 711/165 |
| 2008/0141048 A1* | 6/2008 | Palmer et al. | 713/300 |
| 2009/0094427 A1* | 4/2009 | Sano | 711/162 |
| 2010/0005465 A1* | 1/2010 | Kawato | 718/1 |

OTHER PUBLICATIONS

Newton's Telecom Dictionary, 21st ed., Mar. 2005.*
Chanchio, K. et al, "Data Collection and Restoration for Heterogeneous Process Migration", Software Practice & Experience, vol. 32, No. 9, Jul. 25, 2002, pp. 845-871.

* cited by examiner

*Primary Examiner* — Brendan Higa
(74) *Attorney, Agent, or Firm* — Mattingly & Malur, PC

(57) ABSTRACT

Geographically dispersed data centers each include servers and storage systems and are in communication with each other. An application is installed on a guest operating system on a virtual machine set up on a server at a first data center. The application accesses a logical unit on a storage system at the first data center. When migration of the application is initiated, the process determines whether any of the data centers has server resources and storage resources required to receive migration of the application. A destination data center is selected from candidate data centers meeting requirements for migration of the application. The application and guest operating system are migrated from the first data center to a second virtual machine set up on a second server at the destination data center. If a replica of the LU is not already present at the destination data center, the LU is also replicated.

16 Claims, 15 Drawing Sheets

Geographic Dispersed Data Center

Geographic Dispersed Data Center

Remote Copy Configuration

| Server ID 12101 | Location 12102 | CPU Performance 12103 | Memory 12104 | LAN I/F 12105 | SAN I/F 12106 | Connectable Storage 12107 | Management Port IP Address 12108 |
|---|---|---|---|---|---|---|---|
| 1 | Datacenter1 | 4core, 3GHz | 4GB | 1Gbit Ether: 10.10.10.10(8:0 :20:10:d2:ae) 10.10.10.11(8:0 :20:10:d2:af) | 4Gbps FC: 0x50060B00001EE5E0 | 1,2,3,... | 10.10.10.10 |
| ... | ... | ... | ... | ... | ... | ... | ... |
| 100 | Datacenter3 | 2core, 2GHz | 2GB | 10Gbit Ether: 10.20.10.10(8:0 :20:10:d2:be) 10.20.10.11(8:0 :20:10:d2:bf) | 4Gbps FC: 0x50060B00001FF5E0 0x50060B00001FF5E1 10Gbit TOE for iSCSI: 10.20.10.12 | 100,102,103,... | 10.20.20.20 |
| ... | ... | ... | ... | ... | ... | ... | ... |

Server Resource Table

FIG. 6

| Server ID | Hypervisor ID | Hypervisor Type | Guest OS ID | Guest OS Type | App ID | App Type | LAN I/F | SAN I/F | LU ID |
|---|---|---|---|---|---|---|---|---|---|
| 1 | 0 | 5 | 0 | 4 | 0 | OLTP | 8:0:20:10:d2:ae | 0x50060B00001EE5E0 | 1 |
| 1 | 0 | 5 | 1 | 4 | 1 | File share | 8:0:20:10:d2:ae | 0x50060B00001EE5E0 | 200 |
| 1 | 0 | 5 | 2 | 4 | 2 | Web service | 8:0:20:10:d2:af | 0x50060B00001EE5E0 | 300 |
| 1 | 0 | 5 | 3 | 4 | 3 | Archiving | 8:0:20:10:d2:af | 0x50060B00001EE5E0 | 2 |
| ... | ... | ... | ... | ... | ... | ... | ... | ... | ... |
| 100 | 200 | 3 | 300 | 7 | 500 | File share | 8:0:20:10:d2:be | 0x50060B00001FF5E0<br>0x50060B00001FF5E1 | 250, 350 |
| 101 | 200 | 3 | 300 | 7 | 500 | File share | 8:0:20:10:d2:ce | 0x50060B00001FF5F0<br>0x50060B00001FF5F1 | 400 |
| ... | | | | | | | ... | ... | ... |

Server Virtualization Table

FIG. 7

| 1230 ↘ | 12302 | 12303 | 12304 | 12305 | 12306 | 12307 | 12308 |
|---|---|---|---|---|---|---|---|
| Storage ID | Location | SAN I/F / Path ID | Cache Memory | # of LU | Total capacity | Unallocated Capacity | Management Port IP Addr |
| 1 | Datacenter1 | 4Gbps FC:<br>0x10060B00001FF5E0/0<br>0x10060B00001FF5E1/1<br>...<br>10Gbit TOE for iSCSI:<br>10.10.10.20/100<br>10.10.10.21/101<br>... | 1TB | 1000 | 200TB | 40TB | 10.10.10.30 |
| ... | ... | ... | ... | ... | ... | ... | ... |
| 100 | Datacenter3 | 4Gbps FC:<br>0x10060B00001FF6E0<br>0x10060B00001FF6E1<br>... | 250GB | 250 | 100TB | 15TB | 10.20.20.40 |
| ... | ... | ... | ... | ... | ... | ... | ... |

Storage Resource Table

FIG. 8

| Storage ID | LU ID | Path ID | Target ID | LUN | Capacity | Type | Status | Virtualized LU (Storage ID/ LU ID) |
|---|---|---|---|---|---|---|---|---|
| 1 | 0 | 0 | 0 | 0 | 20GB | RAID5/Normal | online | N/A |
|  | 1 | 0 | 0 | 1 | 10GB | RAID1/OLTP | online | N/A |
|  | 2 | 1 | 1 | 0 | 100GB | RAID6/Archive | online | 100/0 |
|  | ... | ... | ... | ... | ... | ... | ... | ... |
|  | 900 | N/A | N/A | N/A | 50GB | RAID3/Stream | not allocated | N/A |
|  | 1000 | N/A | N/A | N/A | 10GB | RAID5/Normal | Failed | N/A |
| 100 | 0 | 0 | 0 | 0 | 100GB | RAID6/Archive | online | N/A |
|  | ... | ... | ... | ... | ... | ... | ... | ... |
| ... | ... |  |  |  |  |  |  |  |

Storage LU Table

| Data Center ID | Maximum Power Consumption | Upper Threshold | Lower Threshold | Typical Power Consumption |
|---|---|---|---|---|
| Datacenter1 | 1000KVA | 900KVA | 800KVA | 600KVA |
| ... | ... | ... | ... | ... |

12501, 12502, 12503, 12504, 12505

Power Consumption Table

| Replication ID | Primary Storage ID | Primary LU ID | Secondary Storage ID | Secondary LU ID | Replication Status |
|---|---|---|---|---|---|
| 0 | 1 | 1 | 400 | 1 | Pair |
| ... | ... | ... | ... | ... | ... |

12601, 12602, 12603, 12604, 12605, 12606

Replication Table

| Application Migration ID | Primary App ID | Primary Server ID | Primary Data Center | Secondary App ID | Secondary Server ID | Secondary Data Center | Migration Status |
|---|---|---|---|---|---|---|---|
| 0 | 0 | 1 | Datacenter1 | 1000 | 500 | Datacenter2 | Pair |
| ... | ... | ... | ... | ... | ... | ... | ... |

12701, 12702, 12703, 12704, 12705, 12706, 12707, 12708

Application Migration Management Table

FIG. 12

Replication Status Transition

App Migration Status Transition

Provisioning Process

Identify Resources Required to be Provisioned (Step 6010)

| Data Center ID | Upper Threshold of Percentage of Idle Servers | Lower Threshold of Percentage of Idle Servers | Current Percentage of Idle Servers |
|---|---|---|---|
| Datacenter1 | 20 | 5 | 2 |
| Datacenter2 | 15 | 5 | 25 |
| ... | ... | ... | ... |

Server Resource Consumption Table

Search Resources in Remote Data Centers (Step 6030)

STORAGE AND SERVER PROVISIONING FOR VIRTUALIZED AND GEOGRAPHICALLY DISPERSED DATA CENTERS

BACKGROUND OF THE INVENTION

1. Field of the Invention

The present invention relates generally to storage and information systems.

2. Description of Related Art

Large companies and other enterprises may have multiple data centers that they use to conduct their business. For example, carriers who provide phone and Internet-related services will generally have multiple geographically dispersed data centers to cover their service area. These enterprises may be running a variety of different services including voice transmission, e-mail, Internet access, messaging, video streaming, and the like, using servers and storage systems at the data centers. Thus, the effective and efficient use of resources such as the servers and storage systems in these data centers is necessary for the successful operation of these enterprises.

Server virtualization is a technology that enables server consolidation in certain information system arrangements, such as at data centers, by allowing single physical servers to provide a plurality of virtual server environments using virtual machine software. Under this technology, one or more physical servers can be divided into multiple virtual server environments instead of having multiple dedicated physical servers, each running a different server environment. Server virtualization can be used to eliminate the requirement for having a large number of different physical servers in a data center, and thereby enable more efficient use of server resources, while improving server availability. Also, server virtualization can help reduce overall costs, reduce power consumption, reduce time for server provisioning, centralize server management and administration, assist in agile service deployment and improve disaster recovery capabilities. Furthermore, in addition to server consolidation through virtualization, clustering of servers through virtualization is also becoming common in data centers for load balancing, high availability and disaster recovery. Through clustering, loads on servers can be better distributed and availability can be improved.

However, problems of coordination between server virtualization management and storage virtualization management currently exist for resource provisioning in environments including geographically-dispersed data centers. For example, using server virtualization technology, a user can migrate an application from a server at one data center to a server at another data center. This does not pose a problem from the application standpoint since the CPU resources of a server at one data center are generally interchangeable with those at another data center. However, the storage resources which contain the data used by the application also need to be made available for the migrated application.

Additionally, as server consolidation makes progress, power consumption per a certain cubic volume at data centers is increasing. Not only is the power consumed directly by CPU chips and other components becoming a concern, but also the cooling requirements for the servers, storage systems, and the like. Thus, the cost of electricity is growing to be a significant portion of the total cost of operation in some data centers. Further, the power consumption rate permitted is sometimes limited by contracts with power suppliers. Such data centers are not permitted under their contracts to use an amount of power over a specified limit, and raising the limit, will result in a higher monthly fee for the data center. Thus, data center operators need to monitor the trade off between application availability and power consumption costs.

Related art includes U.S. Pat. No. 6,854,034, to Kitamura et al., entitled "Computer System and a Method of Assigning a Storage Device to a Computer", the disclosure of which is incorporated herein by reference. However, the prior art does not disclose a provisioning method combining server virtualization management and storage virtualization management that takes into consideration the availability of data replication and power consumption.

SUMMARY OF THE INVENTION

The invention provides for resource provisioning in a virtualized environment combining server and storage management. In some embodiments, the invention may be applied in geographically dispersed data centers for improved function and efficiency. These and other features and advantages of the present invention will become apparent to those of ordinary skill in the art in view of the following detailed description of the preferred embodiments.

BRIEF DESCRIPTION OF THE DRAWINGS

The accompanying drawings, in conjunction with the general description given above, and the detailed description of the preferred embodiments given below, serve to illustrate and explain the principles of the preferred embodiments of the best mode of the invention presently contemplated.

FIG. 6 illustrates an exemplary data structure of a server resource table of the invention.

FIG. 7 illustrates an exemplary data structure of a of a server virtualization table of the invention.

FIG. 8 illustrates an exemplary data structure of a storage resource table of the invention.

FIG. 9 illustrates an exemplary data structure of a storage logical unit table of the invention.

FIG. 10 illustrates an exemplary data structure of a power consumption table of the invention.

FIG. 11 illustrates an exemplary data structure of a remote copy table of the invention.

FIG. 12 illustrates an exemplary data structure of an application migration table of the invention.

DETAILED DESCRIPTION OF THE INVENTION

Figure 1:
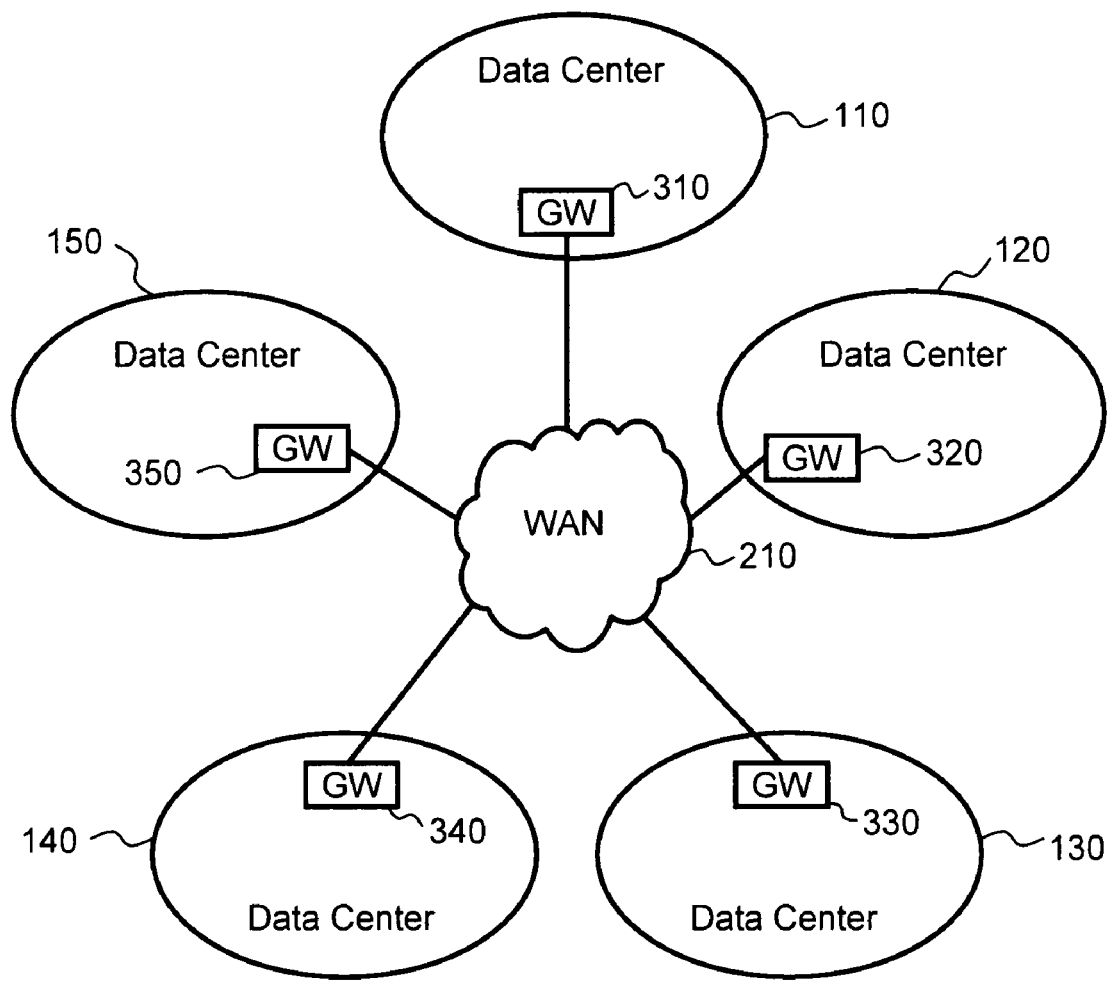
FIG. 1 illustrates an example of an arrangement of geographically dispersed data centers in which the invention may be implemented.

In the following detailed description of the invention, reference is made to the accompanying drawings which form a part of the disclosure, and, in which are shown by way of illustration, and not of limitation, specific embodiments by which the invention may be practiced. In the drawings, like numerals describe substantially similar components throughout the several views. Further, the drawings, the foregoing discussion, and following description are exemplary and explanatory only, and are not intended to limit the scope of the invention or this application in any manner.

In some embodiments, the invention is applied to geographically dispersed data centers operably connected for communication via a wide area network (WAN). Each data center may include a server group using server virtualization technology and a storage group using storage virtualization technology. A Storage Area Network (SAN) may be implemented at each data center for enabling data transfer between servers and storages, and data transfer between different storages. Also, a Local Area Network (LAN) can be used for any data transfer, including resource management. Management software is implemented for managing server virtualization and storage virtualization including configuration management, physical to logical mapping, performance management, failure management, and power consumption management. Additionally, the software of the invention can be embodied in a computer readable storage medium.

Server virtualization may be implemented in the servers of the invention using virtual machine software. Examples of virtual machine software include VMotion available from VMware, Inc., of Palo Alto, Calif., and Microsoft Virtual Server, available from Microsoft Corp. of Redmond, Wash. One or more virtual machines may be set up on a host server, and a guest operating system can be installed on each virtual machine. Applications, such as for providing services to customers, can then be run on the virtual machine using the guest operating system. The applications can also use virtualized storage under the invention, as discussed further below.

The invention includes methods for automatic and dynamic migration of one or more applications from one server to another server. In migration of an application according to the invention, the application software is set up on a separate server, preferably so as to run with the same settings as on the current server. For example, the application and the guest operating system may be set up on a destination server at a remote data center using virtual machine software. The settings for the application following migration may be set to be the same as before migration, so that the migrated application can be taken up (i.e., started) where the original application leaves off. Also, in order for migration to be seamless, any logical units used by the application at the original data center need to be replicated to the destination data center and kept up to date so that the migrated application is able to assume the services performed by the original application when the original application is suspended, or during failure, disaster recovery, or the like.

In some embodiments, the invention is applied to a combination of server virtualization management and storage virtualization management. When migrating an application on a guest OS, an appropriate candidate server and storage resource are selected based on data replication availability, adequate server resource availability, and impact analysis. A change of a storage setting is synchronized with a change of a server setting. Also, when migrating an application on a guest OS, an appropriate candidate server and storage resource are provided while taking into consideration power consumption. For example, maintaining the power consumption within a predetermined limitation for a certain data center. Further, impact analysis may be performed after migration, and a notification may be sent if the migration causes a power consumption limit to be exceeded.

Exemplary Configuration of Data Centers

FIG. 1 illustrates an example configuration of an information system including a plurality of data centers 110, 120, 130, 140, 150 operably connected for communication with each other through a Wide Area Network (WAN) 210 via network gateways (GWs) 310, 320, 330, 340, 350, respectively. Gateways 310, 320, 330, 340, 350 convert a WAN network protocol to a Local Area Network (LAN) network protocol which is used for communication inside the data center. Gateways 310, 320, 330, 340, 350 may include functions for named packet shaping and/or WAN optimization, including data compression for effective use of the WAN. As an example, WAN 210 may be the Internet and the LAN may be a local Ethernet network, although the invention is not limited to any particular network type.

Figure 2:
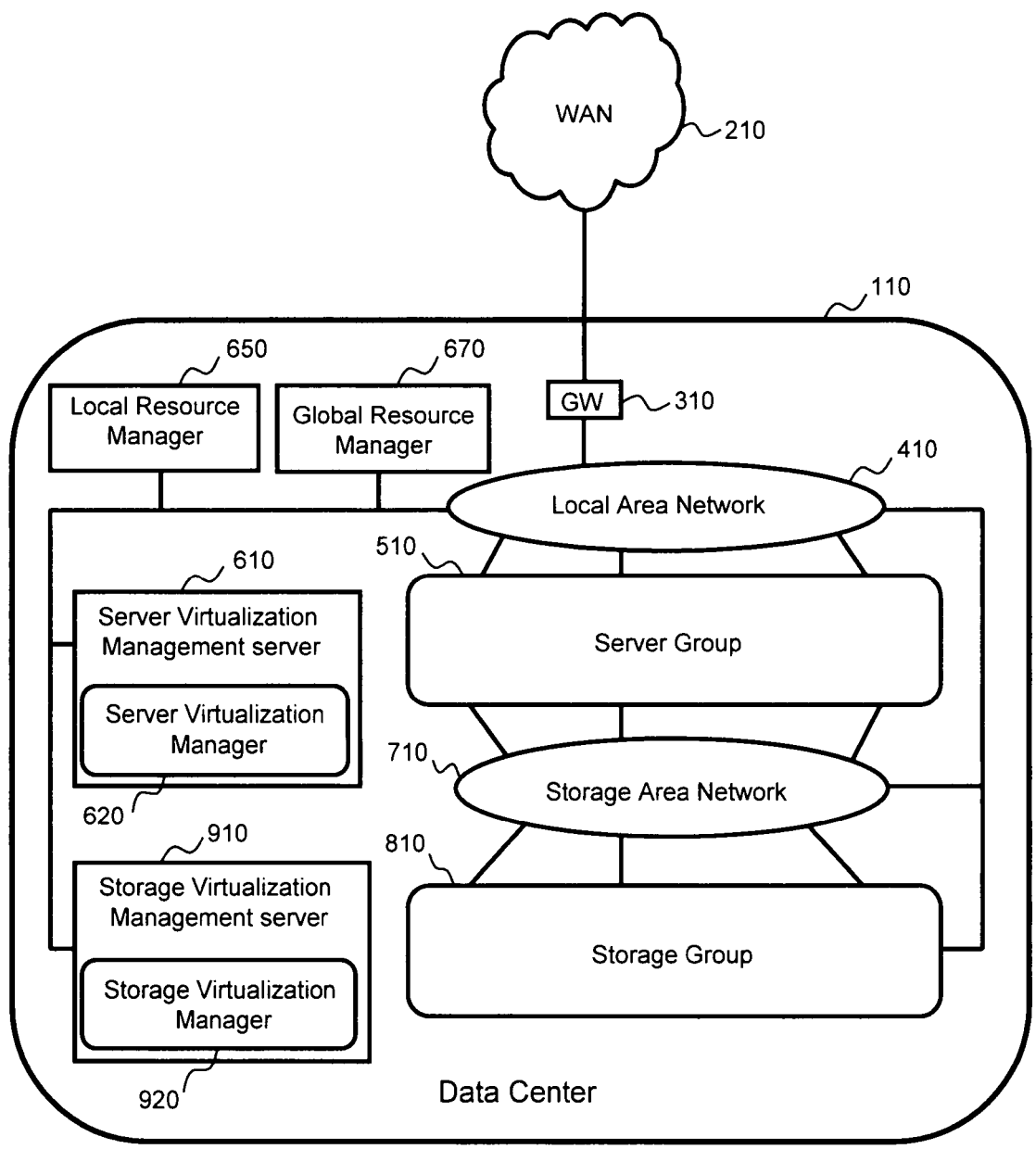
FIG. 2 illustrates an exemplary configuration of a data center in which the invention may be implemented.

FIG. 2 illustrates an example of a general configuration inside a data center, which uses server virtualization technology and storage virtualization technology. Data center 110 is illustrated, with it being understood that data centers 120, 130, 140, 150 may have the same or similar configurations, although not all of data centers 120, 130, 140, 150 are required to have all the components illustrated in FIG. 2.

In data center 110, a server virtualization management server 610 manages server virtualization, including physical-server-to-guest-OS mapping, using server virtualization manager software 620. A storage virtualization management server 910 manages storage virtualization, including physical-storage-to-logical-volume mapping, using storage virtualization manager software 920. Server group 510 includes a plurality of virtualized servers as is discussed below with reference to FIG. 3, and storage group 810 consists of storage systems virtualizing other storage systems and virtualized storage systems, as is discussed below with reference to FIG. 4. A Storage Area Network (SAN) 710 provides data transfer between storage systems in storage group 810 and/or between servers in server group 510 and storage systems in storage group 810. A Local Area Network (LAN) 410 provides data transfer not limited to storage of data. A typical storage system includes a LAN communication interface for management purposes. Storage virtualization manager 920 is able to communicate with storage systems in storage group 810 via LAN 410 for managing and configuring the storage systems. Similarly, server virtualization manager 620 is able to communicate with server group 510 via LAN 410 for managing and configuring servers in server group 510.

A local resource manager 650 in data center 110 is a program that may run on a virtual machine or on another computer or server in the data center, and that maintains a list of all the resources inside the data center, such as server resources and storage resources, and tracks the statuses of these resources. Additionally, at least one data center out of the plurality of data centers 110, 120, 130, 140, 150 includes a global resource manager 670, which is a program that may run on a virtual machine or on another computer or server in the data center, and that communicates with each local resource manager 650 at each data center 110, 120, 130, 140, 150 to collect lists of resources and their statuses from each of these other data centers to create and maintain a list of all the resources of all the data centers 110, 120, 130, 140, 150. Not every data center is required to maintain a global resource manager 670, so long as they are able to access global resource manager 670 when necessary for searching for available resources in remote data centers.

Figure 3:
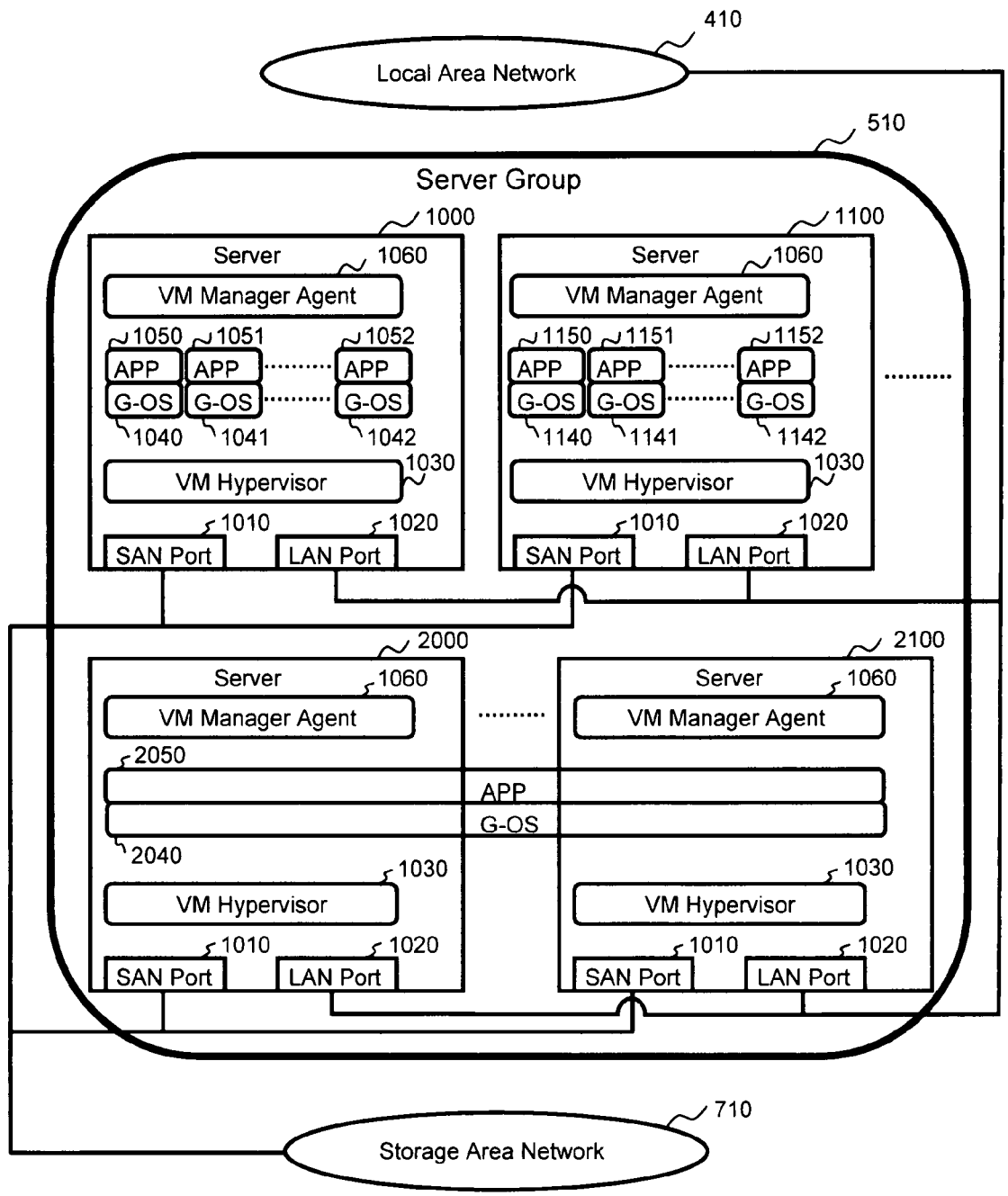
FIG. 3 illustrates an exemplary configuration of a server group.

FIG. 3 illustrates an exemplary arrangement of server group 510, which is composed of a plurality of physical servers, such as servers 1000, 1100, 2000, 2100. Each server 1000, 1100, 2000, 2100 has a virtual machine (VM) hypervisor 1030 that sits on top of server hardware and that emulates dedicated server hardware for guest operating systems (G-OSs) 1040, 1041, 1042, 1140, 1141, 1142, 2040. Guest operating systems are able to function simultaneously and independently of each other through virtual machine software to enable various different applications (APPs), 1050, 1051, 1052, 1150, 1151, 1152, 2050 to run simultaneously and independently on the servers 1000, 1100, 2000, 2100. A VM manager agent 1060 collects and maintains configuration and status information on each of the servers 1000, 1100, 2000, 2100. Additionally, each of the servers includes a SAN port 1010 to enable communication with SAN 710 and a LAN port 1020 to enable communication with LAN 410.

Figure 4:
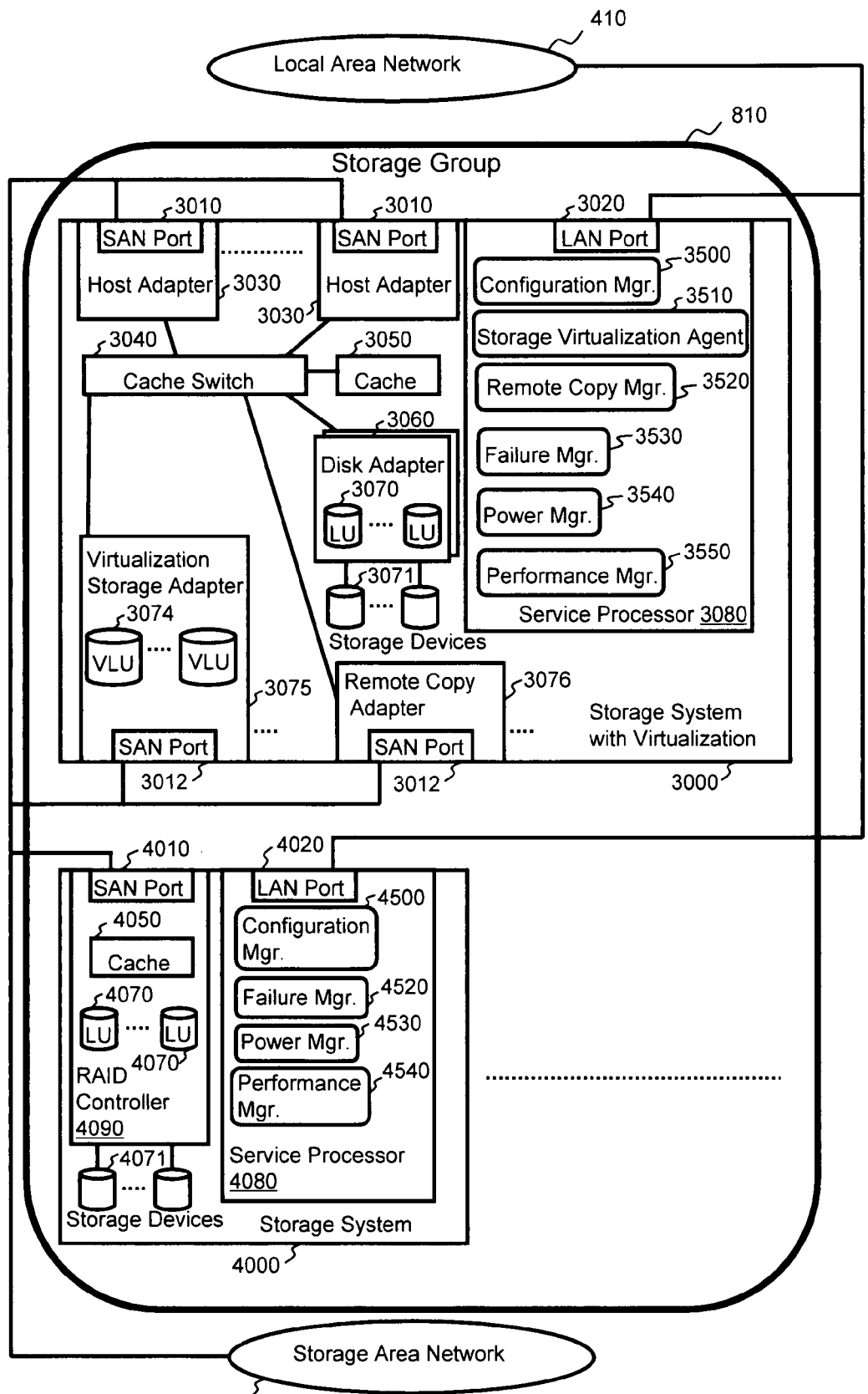
FIG. 4 illustrates an exemplary configuration of a storage group.

FIG. 4 illustrates storage group 810, which includes one or more storage systems, such as storage systems 3000 and 4000. Storage system 3000 with virtualization is a storage system that includes a virtualization function that virtualizes physical storage capacity from one or more storage systems 4000. Under this system of virtualization, storage system 3000 is configured to present one or more virtual storage volumes (virtual logical units—VLUs) 3074 as apparent storage resources, as if the physical storage capacity for these virtual volumes 3074 is provided at storage system 3000, when the physical storage capacity for the virtual volumes is actually provided at storage system 4000 by LUs 4070 configured on storage devices 4071, such as by a RAID controller 4090. Thus, from the servers' point of view each virtual volume 3074 is a storage volume configured from physical capacity located in the storage system 3000, when the physical storage capacity is actually located on storage devices 4071 at one or more storage systems 4000.

Storage system 3000 is able to provide single point management of all the storage systems in the storage group 810, provides an effective management scheme, and servers are able to use additional functions provided by storage system 3000, such as a remote copy function and a high performance cache. Storage system 3000 includes host adapters 3030 for communication with servers over SAN 710 via SAN ports 3010. A virtualization storage adapter 3075 provides communication with storage systems 4000, so that data stored to virtual volumes 3074 is transmitted to logical units 4070 on storage system 4000 via a SAN port 3012. Also, storage system 3000 may include one or more storage devices 3071, such as hard disk drives, solid state memory, optical drives, or the like. In this embodiment, one or more disk adapters 3060 may provide local logical volumes (LUs) 3070 to servers. However, in other embodiments, storage system 3000 does not include any physical storage devices 3071, and serves solely as a virtualization apparatus.

LUs 3070 and virtual LUs 3074 are identified from servers using SCSI (small computer system interface) protocol or the like. Each LU 3070, 3074, 4070 is defined as single logical contiguous memory space with fixed byte blocks. Applications Caches 3050, 4050 are provided to compensate for access latency resulting from access delays in storage devices 3071, 4071, respectively, to achieve better performance and to also provide a data transfer buffer for storage functions including remote copy, snapshot, and the like. A remote copy adapter 3076 having a SAN port 3012 in communication with SAN 710 is included in storage system 3000 for carrying out remote copy functions, as also discussed below. A cache switch 3040 connects host adapters 3030, cache 3050, disk adapters 3060, virtualization adapter 3075 and remote copy adapter 3076. Cache switch 3040 provides performance scalability required for storage system 3000. Service processors (SVPs) 3080, 4080 provide management functions to storage systems 3000, 4000, respectively. SVP 3080 includes a LAN port 3020 and SVP 4080 includes a LAN port 4020 connected to LAN 410 to enable communication with storage virtualization management server 910 and local resource manager 650. SVP 3080 is used to execute a number of management modules, including a configuration manager 3500, a storage virtualization agent 3510, a remote copy manager 3520, a failure manager 3530, a power manager 3540 and a performance manager 3550, each of which manages those respective features of storage system 3000. Similarly, SVP 4080 on storage system 4000 executes a configuration manger 4500, a failure manager 4520, a power manager 4530 and a performance manager 4540.

Remote Copy (LU Replication)

Figure 5:
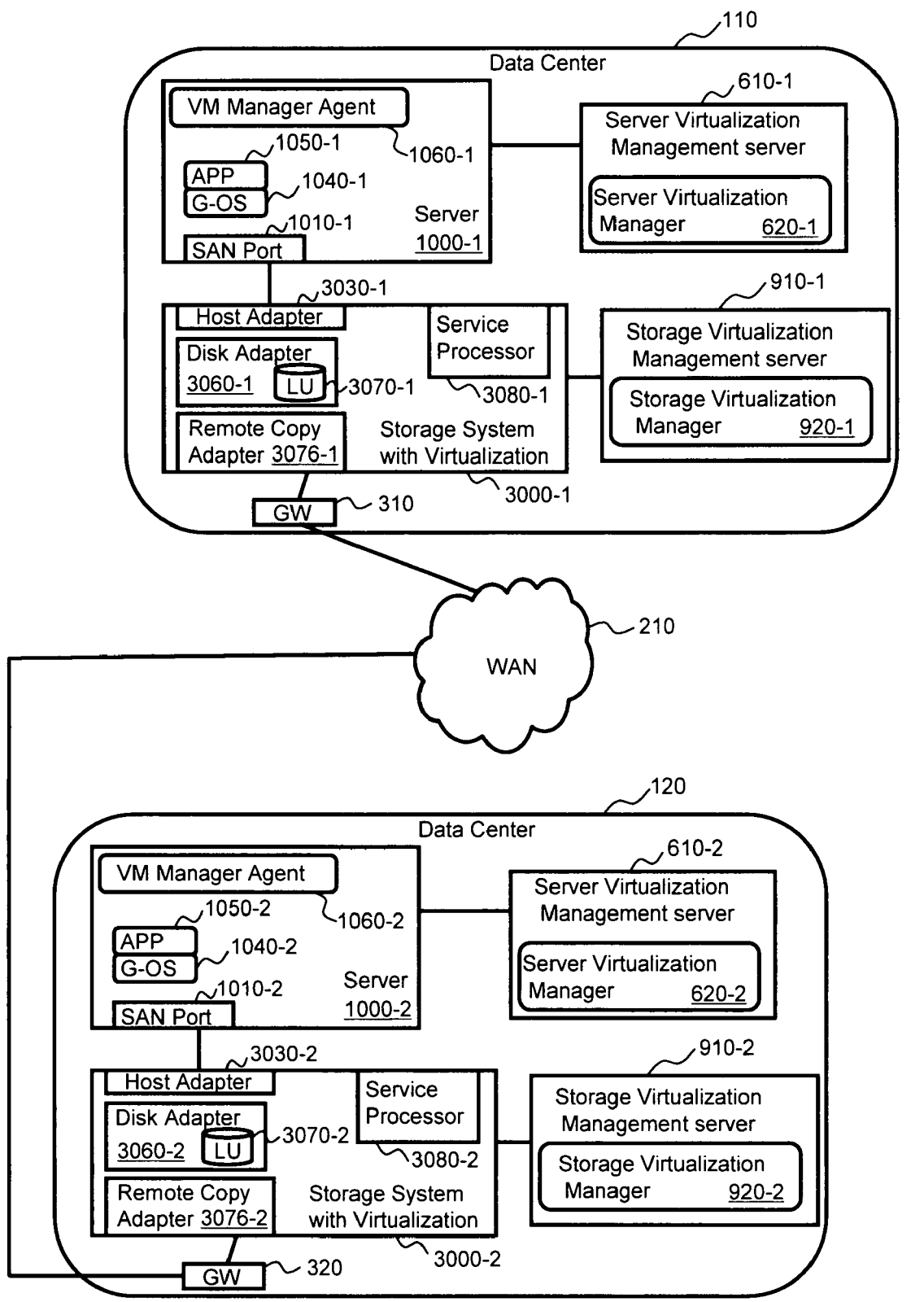
FIG. 5 illustrates an exemplary remote copy configuration between two data centers.

FIG. 5 illustrates an example of a remote copy configuration according to the invention. Remote copy is a popular feature incorporated into enterprise storage systems and entails creating a replication pair between a first LU in a first data center and a second LU in a second data center. Data written to one LU in a first storage system as a primary volume is replicated to the second LU in the other storage system as a secondary volume. The storage systems are able to carryout remote copy functions autonomously without having to send the data through any of the servers. In FIG. 5, data of a first volume on storage system 3000-1 at data center 110 is replicated to a second volume on storage system 3000-2 at data center 120 using remote copy adapters 3076-1, 3076-2 via WAN 210 and GWs 310, 320. In case of disaster at data center 110, services performed by application 1050-1 on server 1000-1 using volume 3070-1 on storage system 3000-1 can be taken over by server 1000-2 at data center 120 by application 1050-2 on server 1000-2 using volume 3070-2. In such a case, server virtualization manager 620-1 on server virtualization management server 610-1 indicates migration of application 1050-1 via VM manager agents 1060-1, 1060-2. As a result, application 1050-2 is initiated on server 1000-2 at data center 120. It should be noted that while logical volumes 3070 are illustrated for remote copy in FIG. 5, virtual volumes 3074 at either data center may also be made part of a replication pair for remote copy. Additionally, for safe and reliable takeover, application migration processes and data replication processes should be synchronized. This synchronization is explained further below with reference to FIGS. 13 and 14.

Resource Tables

A number of resource tables are maintained and used under the invention, as described below with reference to FIGS. 6-12. FIG. 6 illustrates an exemplary data structure of a server resource table 1210, which contains information on servers in the information system. Server resource table 1210 includes a server identifier (ID) 12101, a location field 12102, a CPU performance field 12103, a main memory capacity 12104, LAN I/F performance and address 12105, such as an IP address and MAC address for the interface, a SAN I/F performance and address 12106, including a WWN for the interface, a connectable storage system field 12107, and an IP address 12108 of the management port for the server.

FIG. 7 illustrates an exemplary data structure of a server virtualization table 1220, used by server virtualization manager 620, and which contains information of virtual machines and applications on servers. Server virtualization table 1220 includes a server ID field 12201, a VM hypervisor ID 12202, a hypervisor type field 12203, a guest OS ID 12204, a guest OS type 12205, an application ID 12206, an application type 12207, an address 12208 of the LAN I/F of the server, an address 12209 of the SAN I/F of the server, and a LU IDs field 12210, which are used by the application. Server virtualization table 1220 is used by server virtualization manager 620 to relate guest OSs to application IDs and LU IDs. For example, when a guest OS is migrated, then the correct LU needs to be made connectable or migrated.

FIG. 8 illustrates an exemplary data structure of a storage resource table 1230 which contains information on storage systems in the information system. Storage resource table 1230 includes a storage ID 12301, a location 12302 of the storage system, a SAN I/F performance, address and path ID 12303 to identify which LUs are connectable to the SAN I/F, a capacity 12304 of the cache memory, a number of LUs 12305, a total usable capacity 12306, unallocated capacity 12307 which is the amount of the total capacity not yet allocated to servers, and an IP address 12308 of the management port of the storage system.

FIG. 9 illustrates an exemplary data structure of a storage LU table 1240 which contains information on logical units in the information system. Storage LU table 1240 includes a storage ID 12401; a LU ID 12402, which is a volume ID used internally by the particular storage system; a path ID 12403; a target ID 12404; a logical unit number (LUN) 12405 which is used in SCSI commands and which may be different from the LU ID 12402; a capacity of the LU 12406; a LU type 12407, which can include RAID type, application usage and the like; a LU status 12408, such as "online", "failed" or "not allocated"; and a virtualized LU information 12409, that indicates if the LU is a virtualized LU and that identifies which LU 4070 on one of storage systems 4000 is associated with the LU by specifying the storage ID and LU ID.

FIG. 10 illustrates an exemplary data structure of a power consumption management table 1250 that can be used for managing power consumption at data centers. Power consumption management table 1250 includes a data center ID 12501, a maximum power consumption 12502 permitted under contract, an upper threshold value 12503, a lower threshold value 12504, and a typical power consumption 12505, which is the average consumption measured over a period of time. When the upper threshold value 12503 is exceeded, an administrator should take measures to reduce power consumption so that the consumption falls below the lower threshold value 12504. For example, when the power consumption exceeds the upper threshold value 12503, one or more applications can be migrated to other data centers to decrease the power consumption at the local data center. Also, when the power consumption level of each data center is a consideration for determining which data center should receive migration of an application, power consumption table 1250 of FIG. 10 is used to determine whether enough power resources at each data center would be available to be assigned to a migrating application, which may be determine when carrying out Step 6320 in FIG. 18.

FIG. 11 illustrates an exemplary data structure of a replication table 1260 that is used to manage local and remote copy configurations for managing logical units as replication pairs. Replication table 1260 includes an entry of a replication ID 12601 for identifying the replication pair, a primary storage ID 12602 that indicates the primary storage system, a primary LU ID 12603 that indicates the ID of the primary volume on the primary storage system, a secondary storage ID 12604 that indicates the secondary storage system, a secondary LU ID 12605 that indicates the secondary volume on the secondary storage system that makes up the replication pair with the primary volume, and a replication status 12606 that corresponds to phases illustrated in FIG. 13, as discussed below. Thus, a replication pair can be established between two logical units in the same data center, and/or between a logical unit in a local data center and a logical unit in a remote data center.

FIG. 12 illustrates an exemplary data structure of an application migration table 1270 for managing migration of applications. Application migration table 1270 includes an application migration ID 12701, a primary application ID 12701 used on the primary server, a primary server ID 12702, a primary data center ID 12703, a secondary application ID 12704 used on the secondary server, a secondary server ID 12705, a secondary data center ID 12706, and a migration status 12707 corresponding to the phases illustrated in FIG. 14, as discussed below. For example, when the primary server is running the application and the secondary server is not running the application, a "pair" status indicates that configuration information and key data for starting the application on the secondary server has been migrated to the secondary server so that the application is guaranteed to start and operate properly on the secondary server if there is a failure of the application on the primary server.

Replication and Application Migration Status Diagrams

Figure 13:
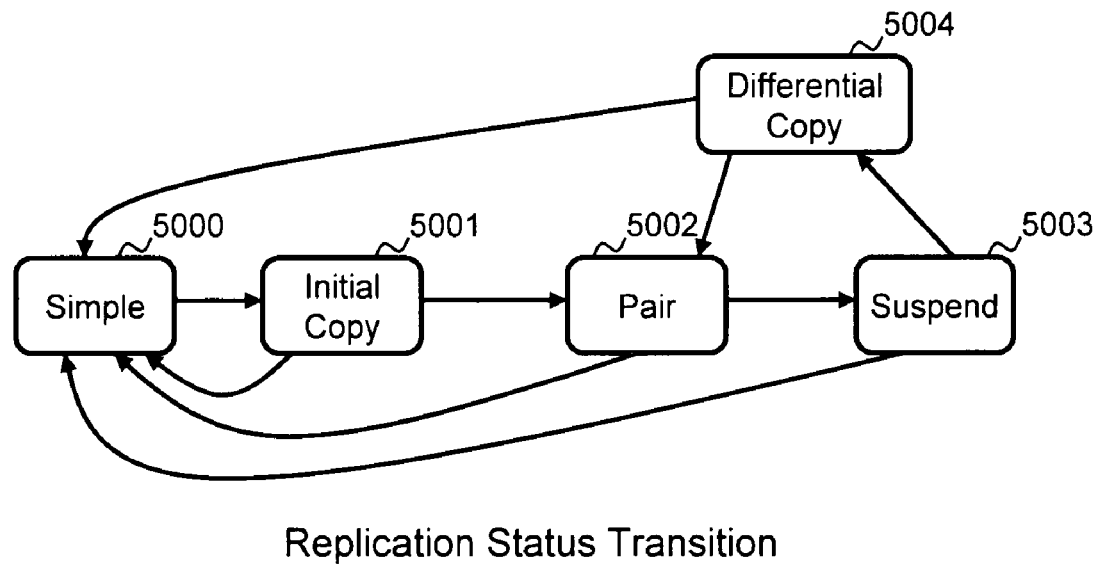
FIG. 13 illustrates an exemplary configuration of a remote copy status transition.

FIG. 13 illustrates a conceptual diagram of status transitions in replication procedures. Replication, such as remote copy, is a function carried out by a storage system to replicate data of a primary LU on one storage system to a secondary LU, typically on another storage system. For example, before a remote copy relationship is established between two LUs, the status of each LU is simple 5000. To create a remote copy pair, the primary and secondary LU that will form the pair must be identified. Once a remote copy relationship is established between two LUs, initial data copy 5001 is started to copy all the data currently in the primary LU to the secondary LU. Pair status 5002 is established when initial copy 5001 is completed, and every block of data is identical between the primary LU and the secondary LU. During pair status 5002, every update I/O operation (i.e., any new data written) to the primary LU is copied to the secondary LU to keep contents of two LUs identical (i.e., a mirrored pair). In some cases, such as when a network link is down, pair status 5002 is suspended and the status of the replication pair is turned to suspended status 5003. Suspended status means that update I/O operations to the primary LU are not copied to the secondary LU, but a differential bit map is maintained to keep track of blocks in the primary LU that have been updated on the primary storage system. Then, in order to resynchronize the replication pair to return to pair status 5002 from suspended status 5003, the differential bit map is used during a differential copy phase 5004 in which all the updated blocks listed in the differential bit map are copied to the secondary LU. Once the differential copy 5004 is completed, status becomes pair 5002. These statuses are managed by SVPs 3080-1, 3080-2 on FIG. 5, based on commands received from an application or management server.

Figure 14:
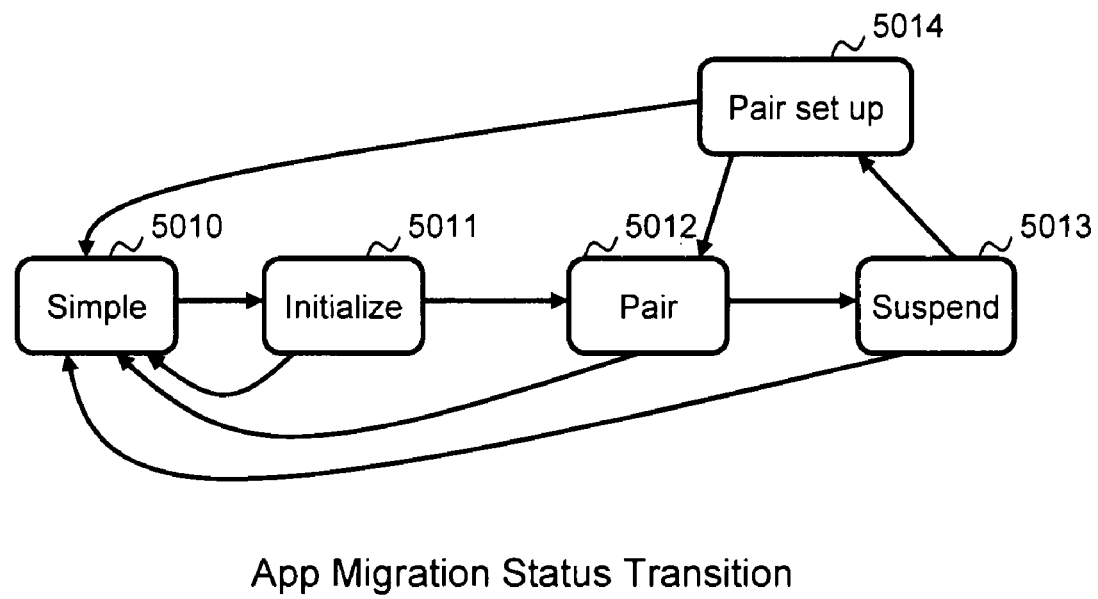
FIG. 14 illustrates an exemplary configuration of an application migration status transition.

FIG. 14 illustrates a conceptual diagram showing application migration status transitions, which includes statuses similar to those discussed above for remote copy. A simple status 5010 is a status without a migration relationship, i.e., migration of the application from one server to another has not yet been initiated. For example, with reference to the configuration illustrated in FIG. 5, App 1050-1 is running on server 1000-1 at data center 110. When App 1050-1 is to be migrated to server 1000-2 at data center 120, then, during an initialize phase 5011, server virtualization manager 620-2 obtains server resources required to support the migration and sets up guest OS 1040-2 corresponding to the application using virtual machine software. Once the guest OS 1040-2 is set up on server 1000-2, pair status 5012 indicates that application 1050-2 is created on the guest OS 1042-2 and prepared for taking over operations. To perform take over of the application from data center 110 to data center 120, status is changed to suspend 5013. Secondary application 1050-2 now starts services to clients in place of the primary application 1050-1. Status can be changed to pair set up 5014 if migration of the application back to data center 110 ever needs to be carried out.

Server Migration and Storage Remote Copy Synchronization

When an application is migrated to another location, data in associated LUs needs to be replicated with the application so that the application is able to continue to function properly following the migration. Application migration is managed by server virtualization manager 620, and remote copy is managed by the SVPs 3080 based on commands from servers, such as storage virtualization management server 910. The migration of the application and copying of the LUs should be synchronized to ensure data and reliable business continuity. For example, once LUs are in a pair status 5002, then application migration is initialized 5011. Once applications are become pair status 5012, then the application can be quiesced, which means to temporarily stop the services or transactions and write any dirty pages onto the secondary LUs (differential copy 5004). Then remote copy is suspended 5003 for the secondary LUs or the LUs are just made simple 5000, so that the application on the secondary server (i.e., destination server) can use data of the secondary LUs on the secondary storage without being affected by any updates on the primary LUs. Further, in case operation of the application needs to be migrated back to the original data center, a reverse replication pair may be established whereby the secondary LUs on the secondary storage system become the primary LUs, and the LUs that were formerly the primary LUs are used as the secondary LUs for receiving remote copy, thereby eliminating the need for initial copy 5001.

Resource Provisioning Process when Migrating an Application

Figure 15:
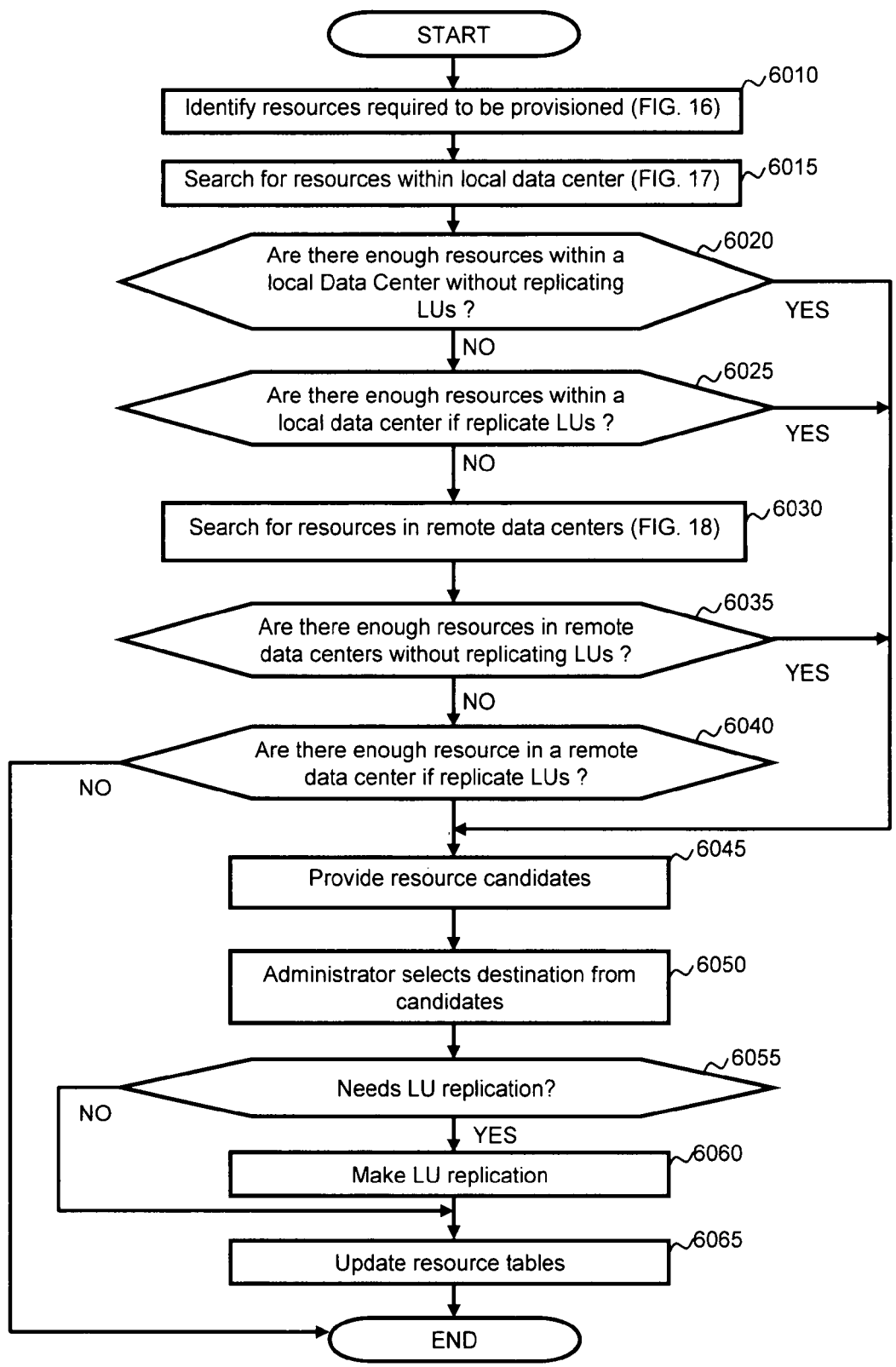
FIG. 15 illustrates an exemplary process for provisioning resources according to the invention.

FIG. 15 illustrates a flow chart of a process for provisioning resources for migrating an application and guest operating system from one server to another. The process of FIG. 15 might be triggered by manually by an administrator, or can be triggered automatically, and can be carried out as a process of virtualization manager 620 or other programs running in the data centers. For example, the process may be triggered to automatically migrate an application when the power consumption at the local data center exceeds the upper threshold 12503 in power consumption table 1250. Another trigger may be when performance of an application falls below a predetermined level as required for high availability or mission critical applications, so that load balancing or load distribution is required to reduce the load on the local data center by migrating one or more applications to a remote data center. The process might be triggered manually by an administrator setting up a remote data center as a contingency for taking over the application in case of failure at the local data center. Also, migration of an application within a local data center might be desired in the case of installation of new equipment, load balancing among existing equipment, optimization of power consumption, or the like.

Step 6010: The resources required to provision the migration are identified, as explained further below with reference to FIG. 16.

Step 6015: Once the resources required have been identified, the process searches for resources within the local data center, as explained below with reference to FIG. 17.

Step 6020: If the required resources are found in the local data center without replication of LUs, the process skips to Step 6045. On the other hand, if there are not the required resources in the local data center without replicating LUs, the process goes to Step 6025. For example, it is desirable that LU replication be avoided and that the migration take place within the local data center, so that migration is simplified. Thus, a resource that might satisfy these requirements would be a second local server able to run the application and use the same LUs. However, such a solution might not meet the specified resource requirements, for example, in the case that the purpose of the migration is to reduce power consumption at the data center, provide redundancy at a second site to protect against failure of a primary site, or other such consideration.

Step 6025: The process next determines whether the required server resource would be sufficient in the local data center if LU replication were performed. If LU replication will satisfy the requirements the process skips to Step 6045, then LU replication is performed in Step 6060 below using a candidate chosen in Step 6045. For example, in some data centers, a server may be able to communicate with LUs on some storage systems, but not with others. Thus, if an application is migrated to this server from another server, such as for load balancing, the LUs need to be migrated so that the other server is able to access them.

Step 6030: Once the search for required resources in a local data center has failed to locate resources that meet the requirements, the process starts to search for the required resources in the remote data centers, as described below with reference to FIG. 18.

Step 6035: If LU replication (i.e., remote copy) has already established from the local data center to one or more other data center, then the data centers having those replicated LUs can be a candidate target for migration of the application because the LUs do not have be replicated again to support the migration. Thus, if a remote data center has the required resources without requiring replication of LUs, then that remote data center can be chosen and the process goes to Step 6045. On the other hand, if there was no remote copy of the required LUs, or if the data center to which the remote copy was made does not have the required resources, then the process goes to Step 6040.

Step 6040: If there are not required resources available at a data center with replicated LUs, but there are enough resources on some other remote data center, then that data center is chosen as a candidate, and it will be necessary to replication the required LUs. On the other hand, if the required resources are not available at any data center, then the process ends.

Step 6045: The resource candidates are selected according to the requirements and taking into account the consideration set forth above.

Step 6050: If there are multiple candidates for the migration, then the administrator may choose one of them.

Step 6055: The process determines whether the chosen candidate requires LU migration. If so, the process goes to Step 6060 and carries out the migration of the LUs from the source storage system to the destination storage system. Otherwise, the process skips to Step 6065.

Step 6065: The related resource tables are updated. For example, server virtualization table 1220 is at least required to be updated when an application is migrated. If LUs are migrated, additional tables, such as storage LU table 1240 must be updated. Depending on the actual conditions of migration, others of the resource tables also will needed to be updated.

Figures 16, 19:
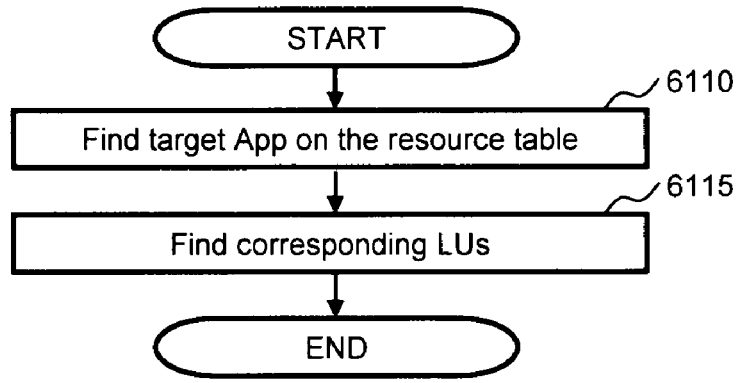
FIG. 16 illustrates an exemplary process for identifying required resources for provisioning.
FIG. 19 illustrates an exemplary data structure of a server resource consumption table of the invention.

FIG. 16 illustrates a flow chart of a process for identifying required resources for carrying out migration in Step 6010 of the process of FIG. 15.

Step 6110: The process determines the identified application to migrate, refers to the server virtualization table 1220 of FIG. 7, and locates the entry for the application.

Step 6115: The process identifies the corresponding LU IDs listed in the server virtualization table 1220 and determines the locations of these LUs.

Figure 17:
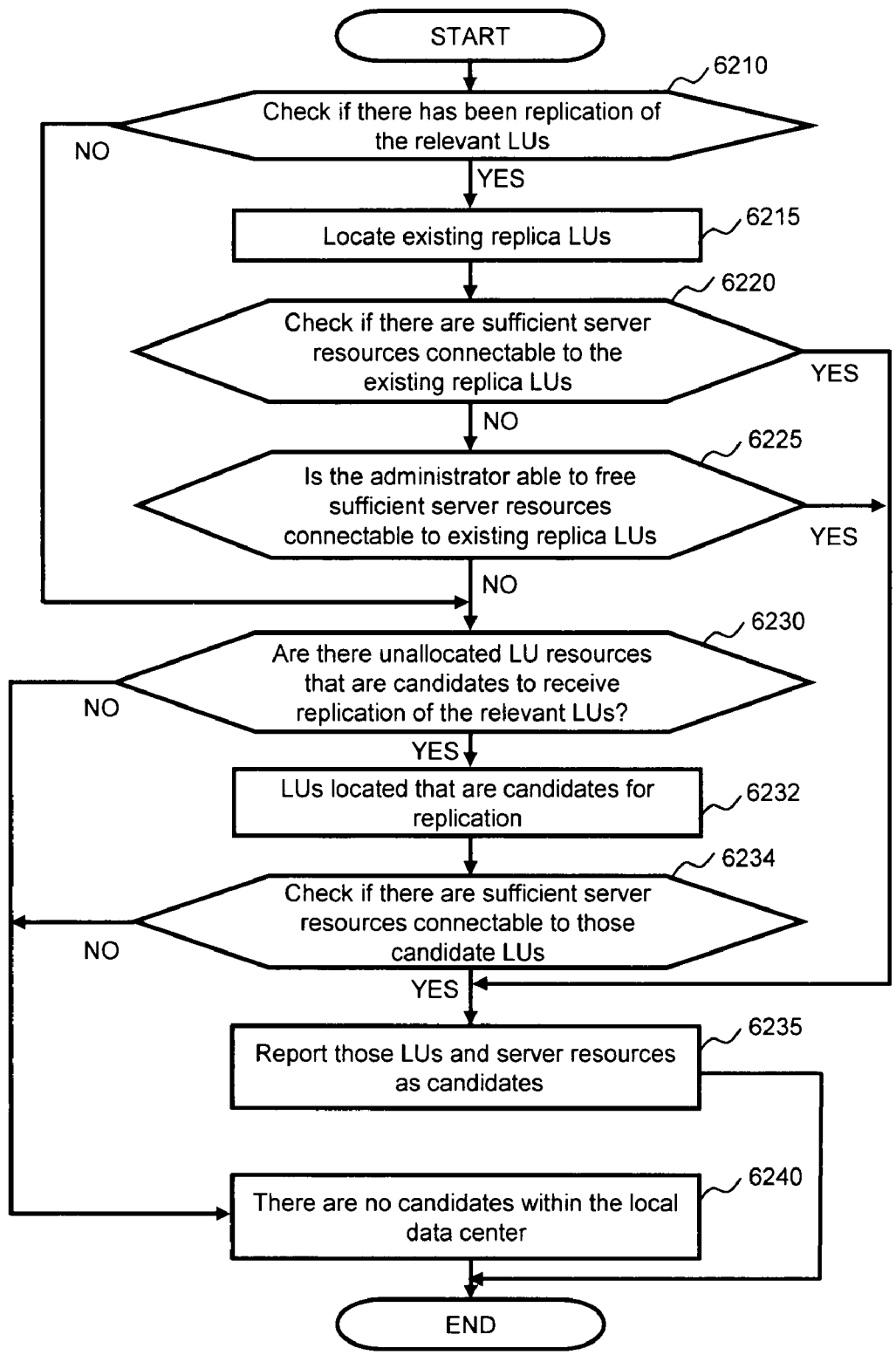
FIG. 17 illustrates an exemplary process for searching for required resources within a local data center.

FIG. 17 illustrates a flow chart of a process for searching for resources within the local data center which is carried out during Step 6015 of the process of FIG. 15.

Step 6210: The process checks whether there are existing replicas of the LUs that are needed to be used by the application by referring to the local resource manager 650 and resource tables 1210, 1220.

Step 6215: When there are existing replica LUs in the local data center, the process locates the existing replicated LUs using replication table 1260 of FIG. 11. In this case, in replication table 1260, the primary storage ID entry 12602 and secondary storage ID entry 12604 would be for storage systems that are both in the local data center, and in some embodiments may be the same storage system.

Step 6220: The process checks whether there are enough server resources associated with the replicated LUs in the local data center using server resource table 1210 of FIG. 6 and server virtualization table 1220 of FIG. 7. For example, an application may require a particular level of performance, and thereby require a certain amount of processing capacity, memory, or other server resources. When a sufficient amount of server resources are not available in the local data center for connection to the existing replica LUs, then the process goes to Step 6225; otherwise, the process goes to Step 6235.

Step 6225: The process reports that there are not enough server resources associated with existing replicated LUs so that the administrator has a chance to change the server configuration to make use of the existing replicated LU resource. Because replicating LUs can take a substantial amount of time, it may be desirable in some instances for the administrator to instead free up server resources. If the administrator is able to free sufficient server resources, then the process goes to Step 6235; otherwise, if the administrator is not involved, or if the administrator is not able to free sufficient server resources, the process continues to Step 6230.

Step 6230: The process checks whether there are sufficient unallocated LU resources connectable to sufficient required server resources within the local data center. For example, a certain amount of storage capacity will generally be required for an application to run and maintain its data. These requirements will vary according to application.

Step 6232: The process locates candidate unallocated LUs in the local data center that can be used to receive replication of the relevant LUs.

Step 6234: The process checks that sufficient server resources are connectable to those candidate LUs.

Step 6235: When sufficient server and storage resources are located in the local storage system, the process reports the located resources as candidate targets of the migration.

Step 6240: On the other hand, when sufficient server or storage resources cannot be located in the local data center, the process reports that there are no migration candidate targets within the local data center.

Figure 18:
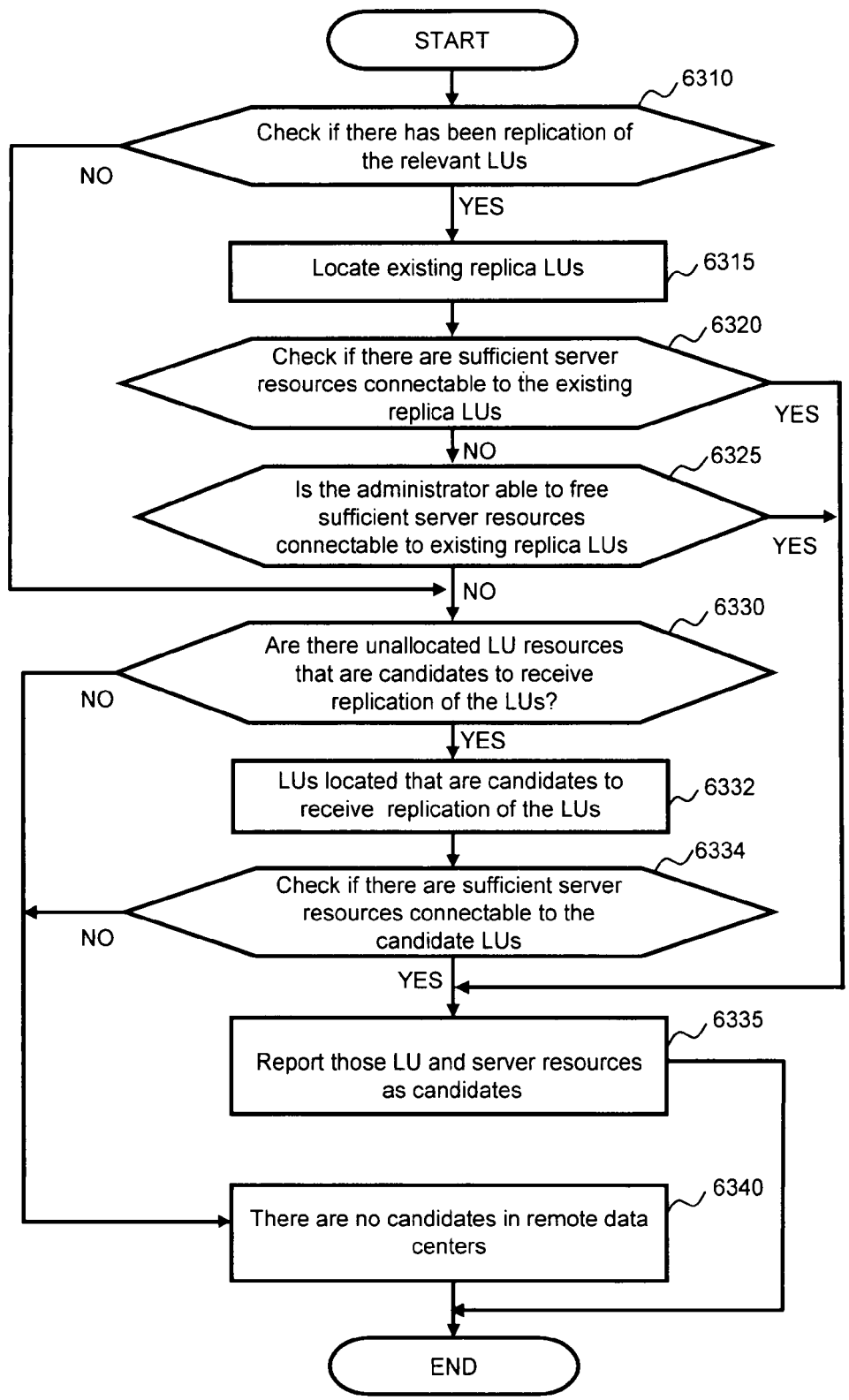
FIG. 18 illustrates an exemplary process for searching for required resources within a remote data center.

FIG. 18 illustrates a flow chart representing a process for searching for resources in the remote data centers. In some instances, one of the requirements of migration is that the migration be made to a remote data center, such as for reducing power consumption at the local data center, load balancing, preparing for disaster recovery, or the like. Accordingly, in these situations, the process would not be able to locate any resources meeting the requirements in the local data center, and would search for available resources in the remote data centers.

Step 6310: The process checks whether there are any existing replicas of the LUs required by the application to be migrated already in place in any of the remote data centers by referring to the global resource manager 670.

Step 6315: The process locates the existing replicated LUs using the remote copy table 1260 of FIG. 11.

Step 6320: The process checks whether there are sufficient server resources available in the remote data center that are connectable to those existing replicated LUs by referring to server virtualization table 1220 of FIG. 7 and server resource table 1210 of FIG. 6. During this step of checking for sufficient server resources, the process also can check for particular requirements of the migration, including power consumption and load balancing, in addition to checking for sufficient processing capacity and memory. For example, in the case of migration to reduce power consumption at the local data center, it is also desirable not to cause the remote data centers to exceed their power consumption limitations. Thus, the process can refer to power consumption table 1250 to locate the entry for the remote data center that has the existing replicated LUs. If the typical power consumption entry 12505 is below the lower threshold 12504, then the remote data center is a good candidate for receiving migration of the application. On the other hand, if the typical power consumption 12505 is near or over the lower threshold 12504, then the remote data center is not a good candidate for receiving the migration. Furthermore, power may be considerably less expensive at a data center located in one country, when compared with a data center located in another country. Accordingly, a power cost consideration may also be added to the server resources requirements when searching for available resources.

Similarly, with respect to load balancing, the process can determine whether the remote data center has sufficient available bandwidth and processing capacity to meet certain performance requirements for the application. If the required bandwidth and processing capacity are not available at that remote data center, then the remote data center is not a good candidate for receiving the migrated application. FIG. 19 illustrates an exemplary server resource consumption table 1280 that may be used to manage load balancing between data centers. In the example illustrated, server resource consumption table 1280 indicates predetermined threshold numbers of idle servers for each data center. Server resource consumption table 1280 includes entries for data center ID 12801, upper threshold of idle servers 12802 and lower threshold of idle servers 12803, and a current percentage of idle servers 12804. Servers in a data center that have a lower CPU load may be categorized as "idle". For example if a server's CPU, as measured over a particular period of time, is in use less than a certain percentage of the time, such as 5-10 percent, then that server can be categorized as idle. Most operating systems today have functions to measure the CPU load on a server.

Thus, the local resource manager 650 is able to determine how many servers in the data center can currently be classified as idle and report this to the global resource manager 670. Then, by referring to server resource consumption table 1280 the process is able to take server loads into consideration when considering whether a data center has sufficient server resources. Furthermore, applications can be migrated to another data center having a current percentage of idle servers 12804 that is more than upper threshold 12802 if the current percentage of idle servers in the current data center falls below lower threshold 12803. For example, in FIG. 19, the current percentage of idle servers 12804 in Datacenter1 is 2 percent, while that of Datacenter2 is 25 percent. Thus, the process may automatically attempt to migrate applications from Datacenter1 to Datacenter2 until the current percentage of idle servers at Datacenter1 passes the upper threshold 12802.

This is one example of load balancing that may take place between data centers according to the invention. In FIG. 6, there are other server resources defined, such as memory, LAN I/F (Network bandwidth), SAN I/F (storage access bandwidth), and the like, other than just CPU load. These resources could also be taken into consideration when determining the load of a data center, such as through calculating what percentage of aggregated resources is being used in a particular data center.

Step 6325: When there are insufficient resources at the remote data center that already has the replicated LUs, the process reports that there are insufficient server resources associated with the replica LUs so that the administrator has a chance to change the server configuration to make use of the existing replicated LU resource. Because replicating LUs can take a substantial amount of time, it may be desirable in some instances for the administrator at the remote data center to instead free up server resources. If the administrator is able to free sufficient server resources, then the process goes to Step 6335; otherwise, if the administrator is not involved, or if the administrator is not able to free sufficient server resources, the process continues to Step 6330.

Step 6330: The process determines whether there are enough server resources associated with unallocated LU resources at any of the remote data centers. The process also checks whether the remote data centers meet other requirements for migration as discussed above, such as power consumption, load balancing, performance, and the like.

Step 6332: The process locates candidate unallocated LUs in one or more of the remote data centers that can be used to receive replication of the relevant LUs.

Step 6334: The process checks that sufficient server resources are connectable to those candidate LUs, taking into account the requirements for migration, including power consumption, load balancing, and the like, as applicable.

Step 6335: The process reports those LU and server resources as migration target candidates in Steps 6040 and 6045 of FIG. 15.

Step 6340: On the other hand, if no resources that match the requirements are located in any of the remote data center, the process returns a response that there are not enough resources available to support migration of the application.

From the foregoing, it will be apparent that this invention can be used in an information technology infrastructure using server virtualization technology and storage virtualization technology, and especially in an architecture incorporating geographically dispersed data centers. The invention is able to automatically and dynamically migrate applications and guest operating systems to take into account various conditions at a plurality of data centers. The invention is able to take into account not only processing resources and data capacity resources, but also data replication availability, power consumption, performance, load balancing, and the like, so that an effective and dynamic information system infrastructure can be achieved over the local and remote data centers.

Thus, it may be seen that the invention provides the ability to dynamically migrate applications, operating systems, and associated data volumes among a plurality of data centers to meet a variety of considerations. Further, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the above description has been made in an illustrative fashion, and not a restrictive one. Accordingly, the scope of the invention should properly be determined with reference to the appended claims, along with the full range of equivalents to which such claims are entitled.

What is claimed is:

1. A method of migrating an application, comprising:

installing the application on a first server by setting up a first virtual machine running a guest operating system at a first data center, the application accessing a first logical unit (LU) on a first storage system at the first data center, wherein data used by the application is stored in the first LU;

maintaining a global resource manager at the first data center, the global resource manager comprising a list of one or more resources available to a plurality of remote data centers and status information for each of the one or more resources, the list of one or more resources including information on one or more logical units (LUs) available to the plurality of remote data centers, wherein the plurality of remote data centers each include a storage system having a plurality of storage devices for providing the one or more LUs;

initiating migration of the application by searching for a candidate remote data center from among the plurality of remote data centers;

consulting the global resource manager to determine whether a replica of the first LU already exists in any of the plurality of remote data centers, wherein the replica of the LU is a LU having a copy of the data used by the application;

when a replica of the first LU exists, determining whether the remote data center at which the replica exists has server resources that meet requirements for migration of the application, and when the remote data center at which the replica exists has server resources that meet the requirements for migration of the application, identifying the remote data center at which the replica exists as the candidate remote data center for receiving the migration;

when a replica of the first LU does not exist, determining whether any of the remote data centers have storage resources and server resources that meet requirements for migration of the application and the data used by the application, and when one of the remote data centers has storage resources and server resources that meet the requirements for migration of the application and the data used by the application, identifying the remote one of the remote data centers as the candidate remote data center for receiving the migration; and in response to identifying a candidate remote data center, migrating the application and the guest operating system to a second virtual machine installed on a second server located at the candidate remote data center.

2. The method according to claim 1, further including the step of initiating the migration by first searching said local data center for available resources by determining if a replica of said first LU exists at the local data center and is accessible by available server resources that meet requirements for migration of the application;

when a replica of the first LU does not exist at the local data center, determining whether the local data center has storage resources and server resources that meet requirements for migration of the application and the data used by the application, and when a replica of the first LU does not exist at the local data center and the local data center does not have storage resources and server resources that meet requirements for migration of the application and the data used by the application, searching for available resources in the plurality of remote data centers.

3. The method according to claim 1, further including the step of creating said first LU as a virtual LU, wherein data stored to said virtual LU on said first storage system is stored by said first storage system to an actual LU in another storage system that maps to the virtual LU, said other storage system being located at the local data center and storing the data to physical storage devices from which the actual LU is configured.

4. The method according to claim 1, wherein said step of identifying a candidate remote data center includes examining power consumption information for the candidate remote data center to determine whether power consumption for the candidate remote data center is within a specified limit.

5. The method according to claim 1, further including the step of replicating the first LU to the candidate remote data center when a replica of the first LU is not already present at the candidate remote data center using a remote copy function, so that the replica of the first LU at the candidate remote data center is synchronized with the first LU when the application is suspended at the local data center and the migrated application at the remote data center is able to use the replica of the first LU to take over for the suspended application.

6. An information system comprising:

a plurality of data centers located geographically remote from each other, the data centers each including one or more servers and one or more storage systems, the data centers being in communication with each other via a network, wherein the plurality of data centers each include a storage system providing logical units (LUs) which hare configured by a plurality of storage devices;

a first virtual machine running on a first server at a first data center, the first virtual machine having a guest operating system with an application installed thereon, the application accessing a first logical unit (LU) on a first storage system at the first data center, wherein data used by the application is stored in the first LU; and a global resource manager at the first data center that collects lists of resources, including LUs, and statuses of resources, from each of the plurality of data centers to create and maintain a list of all the resources of all the data centers, wherein, in response to initiating a migration of the application, the first data center is configured to consult the global resource manager to determine whether a replica of the first LU already exists in any of the plurality of remote data centers, wherein the replica of the LU is a LU having a copy of the data used by the application, wherein when a replica of the first LU exists, the first data center determines whether the data center at which the replica exists has server resources that meet requirements for migration of the application, wherein, when the data center at which the replica exists has server resources that meet the requirements for migration of the application, the first data center identifies the data center at which the replica exists a candidate remote data center for receiving the migration of the application, wherein, when a replica of the first LU does not exist, the first data center determines whether any of the data centers have storage resources and server resources that meet requirements for migration of the application and the data used by the application, wherein, when one of the remote data centers has storage resources and server resources that meet the requirements for migration of the application and the data used by the application, the first data center identifies the one of the data centers for receiving the migration, and wherein, in response to identifying a candidate remote data center, the first data center is further configured to migrate the application and the guest operating system to a second virtual machine installed on a second server located at the candidate remote data center.

7. The information system according to claim 6, wherein said first data center is configured to initiate the migration of the application when a load on the first data center exceeds a predetermined load threshold set for the first data center.

8. The information system according to claim 6, wherein said first data center is configured to initiate the migration of the application when an amount of power consumed at the first data center exceeds a predetermined power consumption threshold set for the first data center.

9. The information system according to claim 6, wherein said first LU is a virtual LU configured on said first storage system, said virtual LU mapping to an actual LU on a second storage system at said data center, wherein data stored to said virtual LU on said first storage system is stored by said first storage system to the actual LU in the second storage system in the first data center, which stores the data to physical storage devices.

10. The information system according to claim 6, wherein said first data center is configured to identify a candidate data center for receiving migration of the application, at least in part, by examining power consumption information for the data centers to determine whether the power consumption for the candidate data center is below a specified threshold.

11. The information system according to claim 6, wherein said first data center is configured to replicate the first LU to the destination data center when a replica of the first LU is not already present at the destination data center using a remote copy function, so that the replica of the first LU at the destination data center is synchronized with the first LU, such that, when the application is suspended at the local data center, the migrated application at the destination data center takes over for the suspended application.

12. An information system comprising:
a local data center having one or more local servers in communication with one or more local storage systems;
a plurality of remote data centers located geographically remotely from each other and the local data center, the remote data centers each including one or more remote servers and one or more remote storage systems in communication with each other, each remote storage system providing logical units (LUs) which are configured by a plurality of storage devices;
the local data center and the plurality of remote data centers being in communication with each other via a network;
a first virtual machine running on a first server at the local data center, the first virtual machine having a guest operating system with an application operational thereon, the application conducting input/output (I/O) operations to a first logical unit (LU) on a local storage system at the first data center, wherein data used by the application is stored in the first LU; and
a global resource manager at the local data center that collects lists of resources, including LUs, and statuses of resources, from each of the plurality of remote data centers to create and maintain a list of all the resources of all the data centers,
wherein, when migration of the application is initiated, the local data center is configured to determine whether the local data center has server resources that meet requirements of the migration of the application;
wherein, when the local data center does not have server resources to meet requirements of the migration of the application, the local data center is configured to consult the global resource manager to determine whether there is a replica of the first LU already existing in any of said plurality of remote data centers, wherein the replica of the first LU is a LU having a copy of the data used by the application,
wherein, when a replica of the first LU exists, the local data center determines whether the data center at which the replica exists has server resources that meet requirements for migration of the application,
wherein, when the data center at which the replica exists has server resources that meet the requirements for migration of the application, the local data center identifies the data center at which the replica exists as a candidate data center for receiving the migration,
wherein, when a replica of the first LU does not exists, the local data center is configured to determine whether any of the plurality of remote data centers have storage resources and server resources that meet requirements for migration of the application and the data used by the application,
wherein, when one of the data centers has available storage resources and server resources that meet the requirements for migration of the application and the data used by the application, the local data center is configured to identify one of the data centers as a candidate data center for receiving the migration, and
wherein, in response to identifying a candidate remote data center, the first data center is further configured to migrate the application and the guest operating system to a second virtual machine installed on a second server located at the candidate remote data center.

13. The information system according to claim 12,
wherein said local data center is configured to initiate the migration of the application when an amount of power consumed at the local data center exceeds a predetermined power consumption threshold or when a load on the local data center exceeds a predetermined load threshold.

14. The information system according to claim 12,
wherein said first LU is a virtual LU configured on said first local storage system said virtual LU mapping to an actual LU on a second local storage system at said local data center,
wherein data stored to said virtual LU on said first local storage system is transferred by said first storage system to the actual LU in the second local storage system in the local data center, which stores the data to physical storage devices.

15. The information system according to claim 12,
wherein said local data center is configured to identify a candidate data center for receiving migration of the application by examining power consumption information for the data centers to determine whether the power consumption for the candidate data center is below a specified threshold.

16. The information system according to claim 12,
wherein said local data center is configured to replicate the first LU to the destination data center when a replica of the first LU is not already present at the destination data center using a remote copy function, so that the replica of the first LU at the destination data center is synchronized with the first LU, such that, when the application is suspended at the local data center, the migrated application at the destination data center uses the replica of the first LU to take over for the suspended application.

* * * * *